United States Patent [19]

Uchida

[11] Patent Number: 4,769,710
[45] Date of Patent: Sep. 6, 1988

[54] METHOD FOR CONTROLLING ACCUMULATION TYPE PHOTOELECTRIC CONVERSION ELEMENT

[75] Inventor: Mitsuaki Uchida, Kaisei, Japan

[73] Assignee: Fuji Photo Film Co., Ltd., Kanagawa, Japan

[21] Appl. No.: 924,815

[22] Filed: Oct. 30, 1986

[30] Foreign Application Priority Data

Oct. 6, 1985 [JP] Japan .................................. 60-248619

[51] Int. Cl.[4] .............................................. H04N 3/14
[52] U.S. Cl. ........................... 358/213.31; 358/213.26
[58] Field of Search ..................... 358/213.26, 213.29, 358/213.31

[56] References Cited

U.S. PATENT DOCUMENTS

| | | | |
|---|---|---|---|
| 4,369,469 | 1/1983 | Endo et al. ...................... | 358/213.31 |
| 4,644,405 | 2/1987 | Roy et al. ........................ | 358/213.26 |
| 4,677,306 | 6/1987 | Yamano .......................... | 358/213.26 |
| 4,689,686 | 8/1987 | Hashimoto et al. ............. | 358/213.26 |

*Primary Examiner*—Jin F. Ng
*Assistant Examiner*—Stephen Brinich
*Attorney, Agent, or Firm*—Wenderoth, Lind & Ponack

[57] ABSTRACT

At least one mode of a group of modes consisting of a photoelectric conversion/accumulation, transfer, hold and read-out mode adapted for image information is controlled by a basic clock signal generated by a central processing unit for driving and controlling an accumulation type photoelectric conversion element. The frequency of the basic clock signal in the read-out mode is made lower than the frequencies of the basic clock signals in the conversion/accumulation, transfer and hold modes. Since the generation and frequency of the basic clock signal are controlled by the software of the CPU provided with no pulse oscillator, the construction of the hardware of the system to which this invention is applied can be simplified. In addition, since the read-out process of the data of the image sensor is performed for every picture element of the entire picture surface and the characteristic value operation with respect to the data of every picture element, the total processing time can be reduced.

2 Claims, 4 Drawing Sheets

METHOD FOR CONTROLLING ACCUMULATION TYPE PHOTOELECTRIC CONVERSION ELEMENT

BACKGROUND OF THE INVENTION

This invention relates to a method of effectively controlling an accumulation type photographic conversion element driven by basic clock signals generated by a central processing unit (CPU) in case of reading out image information of image data in accordance with the mode cycle consisting of the photoelectric conversion, accumulation, transfer, hold and read-out modes.

Recently, in accordance with the development of solid device technique mainly inclusive of an integrated circuit (IC) technique, rapid and large development has also been observed in a technique of an accumulation type photoelectric conversion or transducer element. This technique is, however, not satisfactory for those skilled in this art, and in the field of the application of this art, many techniques or skills have been required, and in order to satisfy these requirements, the image information read-out device is complicated and thus expensive.

FIG. 1 shows a block diagram of a circuit system widely adapted in these days in cases of reading out an image by means of an accumulation type photoelectric conversion element, in which an image sensor 10 consisting of a charge coupled device (CCD) is used as the accumulation type photoelectric conversion element and the image information is synchronized with drive signals CK at an image section 11 to be photoelectrically converted and accumulated (IA), and thereafter transferred (TA) to a hold section 12. The charge once accumulated in the hold section 12 is transferred with a standard scanning system and is then read out (RA) from a read-out register 13 as an image signal PS. The cycle consisting of photoelectric conversion accumulation (IC), transfer (RA) and accumulation read-out (RA) steps is totally equally controlled by the drive signals CK with constant frequencies transmitted from the drive signal generating unit 1, and the timing of this operation is represented by the timing chart shown in FIG. 2. Referring to FIG. 2, in a read-out cycle for an image on a picture image G1, when the photoelectric conversion/accumulation (IA) and the transfer (TA) steps have been completed (at time point t1), the held image information (G1) is read out and the next read-out cycle for the image on a picture image G2 then starts. In the similar manner, when the transfer and hold steps of the image information of the picture image G2 have been completed (at time point t2), the held image information of the picture image G2 is read out and the further next read-out cycle for the picture image G3 starts. Similar operations will be repeatedly carried out in the subsequent steps.

It is necessary for the frequency of the drive signals CK for controlling the respective cycles to be very high such as several hundreds KHz to several MHz for the reason that the application of the drive signals CK with a low frequency makes the accumulating time and the transferring time longer, which adversely results in the degradation of the quality of the image data due to the increasing of the dark current, for example.

Because of this fact, in actual operation, it is necessary to make the frequency of the clock signals CK high and it is also necessary for peripheral circuit elements to have a rapid or quick speed performance or response. These facts make the image information read-out device expensive as a whole. In more detail, the lowering of the frequency of the clock signals CK used as drive signals for the image sensor 10 results not only in a delay of the total processing time, but also the occurrence of a problem of the degradation of the quality such as dark current, for example. On the other hand, the increasing of the frequency thereof to prevent the degradation of the quality, requires the outputting of the image signal at a speed in response to that frequency. This requires a sample-hold circuit to match the image processing system and the processing speed or an analog-to-digital (A/D) converter which is to be operated at high speed, thus being inconvenient.

Taking the above matters into consideration, there has been proposed a driving method with two frequencies in which the frequency of the drive signals CK from the drive signal generating unit 1 is switched in accordance with the magnitude thereof as shown in FIG. 3 so as to thereby utilize the high frequency f1 in the photoelectric conversion/accumulation, transfer and hold modes in the image sensor 10 and to utilize the low frequency f2 only in the read-out mode. In more detail, referring to the timing chart of FIG. 3, with respect to the picture image H1, the photoelectric conversion/accumulation, transfer and hold modes are executed by drive signals of the high frequency f1 and upon the completion of the transfer and hold modes at a time point t10, the read-out mode is started by drive signals of the low frequency f2. During the read-out operation of the picture image H1, the image information of the next picture image HH1 is photoelectrically converted/accumulated, transferred and held, but the accumulated electric charge therefor is based on the low frequency f2, so that the dark current is increased and the quality is also degraded. For this reason, the image information is processed by the high frequency f1 at a time point t11, without utilizing the electric charge, as an image signal P, of the picture image HH1 accumulated during the time when operated with the low frequency f2, to read out the electric charge of the picture image HH1 and then to start the accumulation of an electric charge of the further next picture image H2. The read-out operation of the picture image H2 is performed by the low frequency f2, and the image information of the picture image H2 accumulated at that time is not also utilized as the image signal PS. In the similar manner, the operation continues and the photoelectric conversion/accumulation, transfer, and hold modes are performed by the signal of high frequency f1 and the read-out operation of the accumulated charge is performed by the signal of low frequency f2. During the read-out operation due to the low frequency f2, it is necessary to not use the image data including the dark current component accumulated with the low frequency f2 as the image signal PS. The driving method of the type described above is usually adapted for the read-out process of a stationary picture image, and since it is not necessary for this driving method to be processed at a high speed, integrated circuits and/or other circuit systems can be constructed so as to be operable at a low speed and the output thereof is relatively stable. Against these advantages, the driving method provides disadvantages such as that the processing speed is delayed because the read-out process is carried out by the signal of a low frequency and an extra circuit for switching the frequencies is additionally required.

FIG. 4 is a block diagram showing a drive and read-out system for a conventional image sensor 10 of a generally known type, which is provided with a pulse oscillator 2 for outputting a clock pulse CP with a predetermined frequency. The clock pulse CP is inputted into a control timing unit 3 adapted for controlling the operation and a basic clock 4fcp generated therein is then inputted into a drive timing unit 14 adapted for the driving. The drive timing unit 14 outputs drive signals CK referred to hereinbefore for driving the image sensor 10 in response to the basic clock 4fcp and a vertical synchronizing signal Vsync for representing the synchronism of one picture image scanning due to the operation of the image sensor 10. The whole drive system is totally controlled by a CPU 20, to which a logarithmic converting memory 21 adapted for logarithmic conversion, input/output port 24 and a random access memory (RAM) 25 are operatively connected through a bus line BS. The image signal PS transmitted from the image sensor 10 is inputted into an amplifier 23, from which is transmitted an amplified image signal PSA which is then digitalized (PSD) by an A/D converter 22. The thus digitized value is stored in the RAM 25 as a density value obtained in accordance with a logarithmic table in the converting memory 21. The CPU 20 is also operatively connected to the control timing unit 3 through the input/output port 24, from which a timing signal TM1 controlling the start timing and end timing is outputted and also from which is transmitted a timing signal TM2 which controls the timing of the A/D converter 22, whereby the data conversion from the converting memory 21 can be controlled by the timing signal TM2.

As described in detail hereinbefore, in the driving system for the conventional image sensor 10, the CPU 20 controls or manages the pulse oscillator 2 which always generates pulses with a constant frequency regardless of the operation of the CPU 20. The CPU 20 also controls the driving of the image sensor 10 and the read-out operation of the data. It is thus necessary to use a direct memory access (DMA), which makes the control system complicated, and moreover, in the two-frequency driving method described hereinbefore, the controlling method or operation will be made more complicated.

SUMMARY OF THE INVENTION

An object of this invention is to eliminate defects or disadvantages and to provide a method for controlling an accumulation type photoelectric converting element for realizing the read-out of the image with a relatively short processing time and using a system having a relatively simple and cheap construction.

This and other objects can be achieved according to this invention by providing a method for controlling an accumulation type photoelectric conversion element in which a basic clock signal for driving an accumulation type photoelectric conversion element is prepared in a central processing unit and at least one mode of a group of modes consisting of a photoelectric conversion-accumulation, transfer, hold and read-out modes is controlled by the basic clock signal generated by the central processing unit. In a preferred embodiment, the frequency of the basic clock in the read-out mode is made lower than those of the basic clock signals in the other modes.

The nature, principle and utility of the invention will become more apparent from the following detailed description when read in conjunction with the accompanying drawings.

DESCRIPTION OF THE PREFERRED EMBODIMENT

Figure 1:
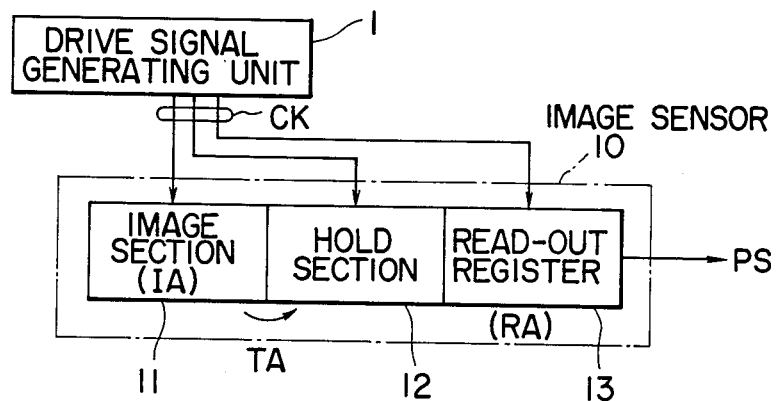
FIG. 1 is a block diagram of a system adapted for explaining the driving operation of an image sensor.
Figure 2:
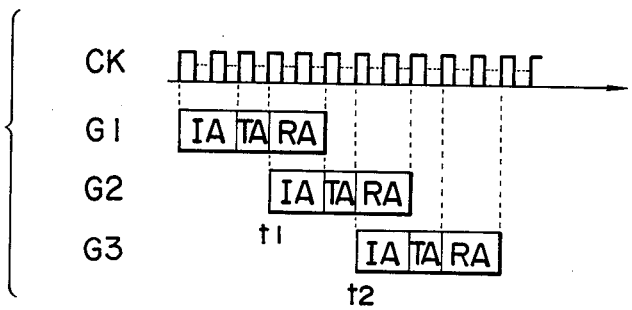
FIGS. 2 and 3 are timing charts used for explaining a read-out process of a conventional image sensor.
Figure 3:
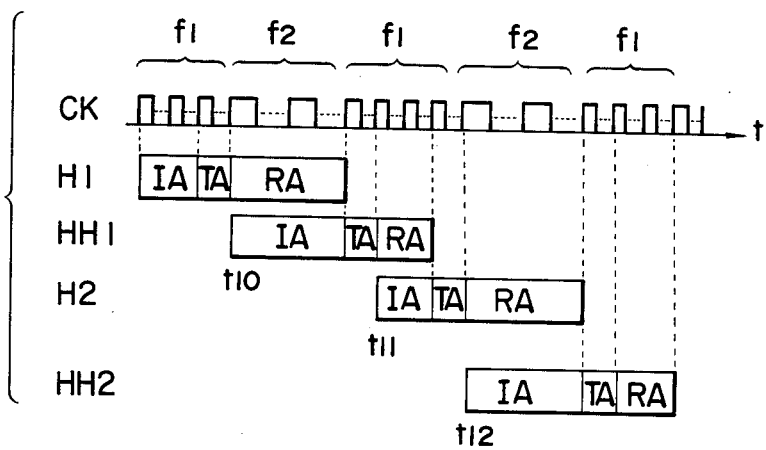
Figure 4:
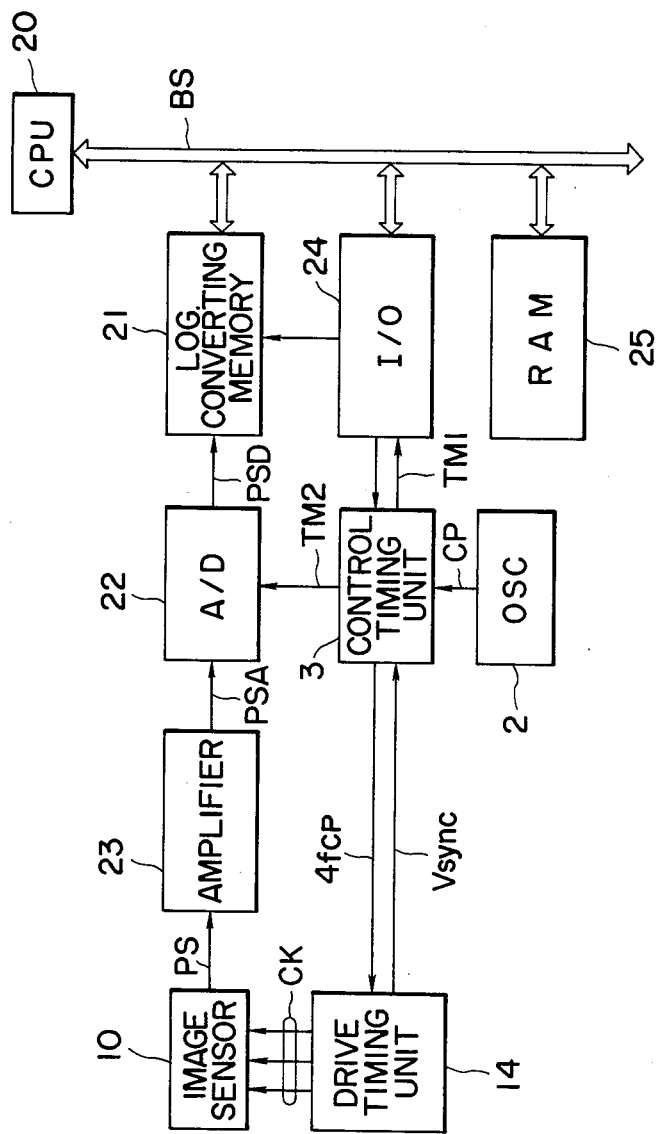
FIG. 4 is a block diagram of a conventional system for reading out a picture image.
Figure 5:
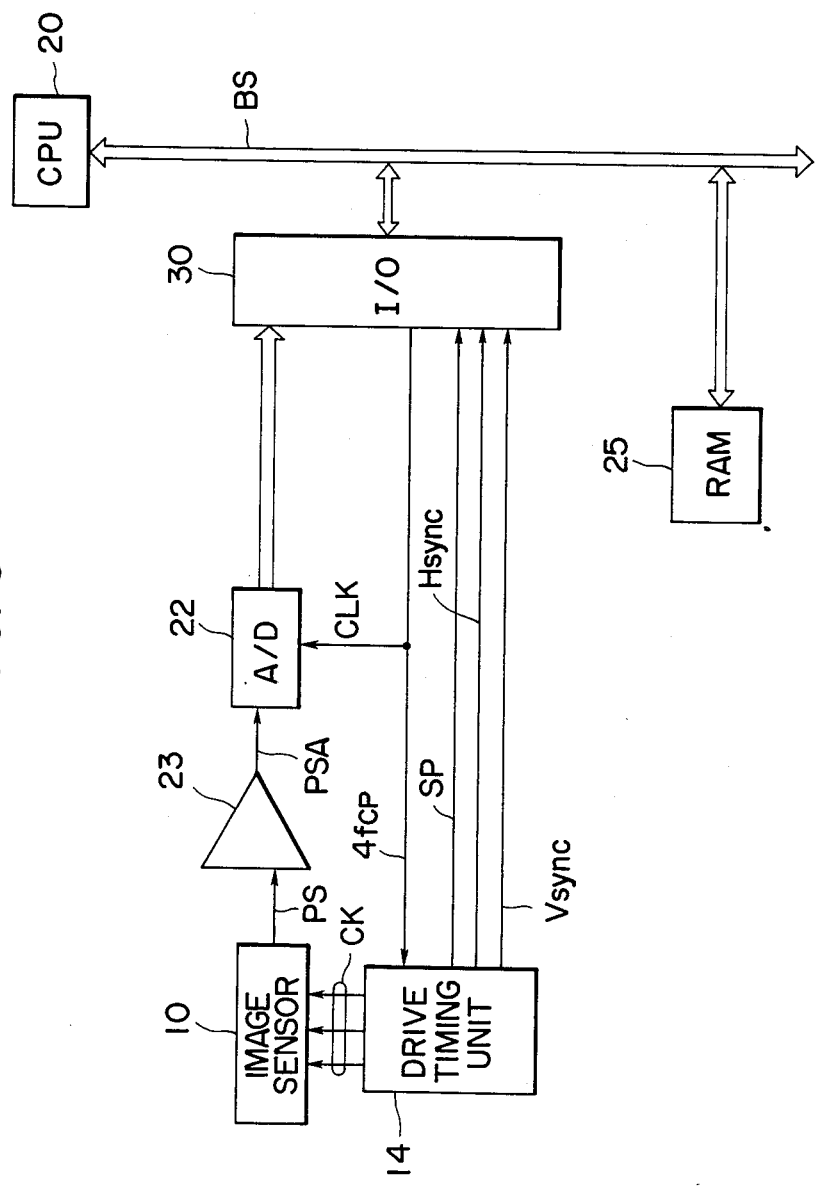
FIG. 5 is a block diagram of a system to which the method of this invention is applicable.

Referring to FIG. 5 showing a block diagram of one embodiment of an apparatus which can be driven by the method according to this invention, the apparatus not being provided with a pulse oscillator, a basic clock signal 4fcp is inputted into a drive timing unit 14 in response to the ON-OFF control of a CPU 20 through an input/output port 30. The output from an A/D converter 22 into which the basic clock signal 4fcp is inputted as a timing pulse CLK is stored in a RAM 25 as a true value through the input/output port 30 and is effected by other treatment or processing. The drive timing unit 14 generates a vertical synchronizing signal Vsync, a picture element clock signal SP corresponding to one picture element of the image sensor 10 and a horizontal synchronizing signal Hsync representing the timing of one scanning line, which are then input to the CPU 20 through the input/output port 30, respectively. The CPU 20 can thus recognize the operation mode of the image sensor 10 in accordance with the inputted vertical synchronizing signal Vsync, the horizontal synchronzing signal Hsync and the picture element clock signal SP.

Figure 6:
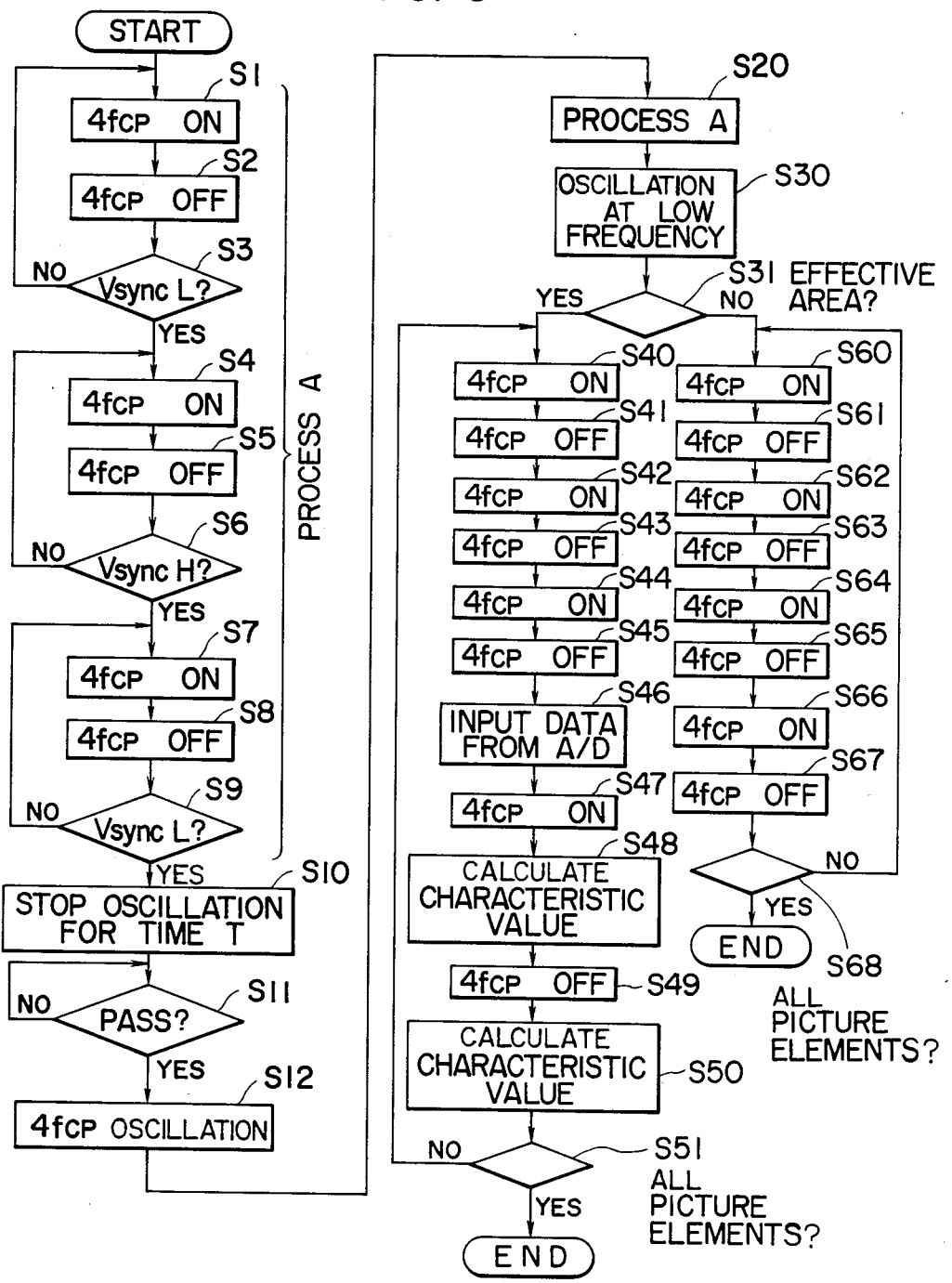
FIG. 6 shows a flowchart for explaining the operation processes or steps of the system shown in FIG. 5.

The processing of the CPU 20 is performed in accordance with the flowchart of FIG. 6, which will be described in detail hereunder.

When the image reading-out processing starts, the CPU 20 operates so as to switch "ON" the basic clock 4fcp with the "H" level (Step S1) and thereafter switch "OFF" the clock 4fcp with the "L" level (Step S2). This operation is repeated until the level of the vertical synchronizing signal Vsync reaches "L" level (Step S3). When the level of the signal Vsync reaches the level "L", the basic clock 4fcp is switched to take "ON" (step S4) and "OFF" (Step S5) conditions and this switching operation is continued until the level of the vertical synchronizing signal Vsync changes from "H" level to "L" level (Steps S4 to S9). In the flowchart of FIG. 6, a process in which the vertical synchronizing signal Vsync changes so as to have the signal level "L"→"H"→"L" in this order is treated as the "process A". During the process A, the CPU 20 generates the basic clock 4fcp with the constant frequency, for example, 4MHz. When the level of the vertical synchronizing signal Vsync reaches "L" level at the step S9, the generation of the basic clock 4fcp is stopped for the predetermined time period T (Steps S10 and S11). During the time interval between the steps S1 and S11, the photoelectric conversion and accumulation processes in the image section 11 of the image sensor 10 are carried out. After the time T elapses and the photoelectric conversion and accumulations are completed, the CPU 20 again generates the basic clock 4fcp with the predetermined frequency 4 MHz, for example (Step S12), and the electric charge accumulated in the image section 11 during the process A is transferred to a hold section 12 (Step S20). When the level of the vertical synchronizing signal Vsync changes in the order of the level "L"→"H"→"L", the electric charge transfer operation is stopped and the CPU 20 generates the basic clock 4fcp to read out the next data with the low frequency (i.e. the frequency which is utilized as a timing pulse CLK for the A/D converter 22) (step S30). At the step S31, in accordance with the picture element clock SP, the vertical synchronizing signal Vsync and the horizontal synchronizing signal Hsync outputted from the drive timing unit 14, it is determined whether or not the effective area on the image sensor 10 is indeed an area for reading out the accumulated electric charge as image information. According to the determination, the image signal PS of the effective area is processed at the steps S40 to S51 referred to hereinafter and unnecessary data of the ineffective area is processed at the steps S60 to S68 also referred to hereinafter.

According to this invention, since data regarding one picture element is putputted by repeating the ON-OFF operation of the basic clock 4fcp four times, the picture element data in the ineffective area is outputted by repeating the ON-OFF operation of the basic clock 4fcp four times at the steps S60 to S67, so that the ineffective data of all picture elements can be outputted by repeating this operation (Step S68). Regarding the picture element data of the effective area, when the four-time ON-OFF operations of the basic clock 4fcp output the effective data of one picture element (Steps S40 to S50, Steps S47 to S49), but at the third ON-OFF operation time (Steps S40 to S45), one picture element data read out before is inputted into the A/D converter 22 through an amplifier 23 (Step S46). In the next step, the basic clock 4fcp is switched on (Step S47) and an operation or calculation of a characteristic value (for example, maximum value, minimum value, density value, etc.) of the data inputted through the input/output port 40 is performed for a predetermined time (I.e. a time within a period of the basic clock 4fcp). The basic clock 4fcp is thereafter switched off (Step S49) and the next characteristic value operation or calculation will be performed at the next step (Step S50) as occasion demands. The data reading out and treating processes made with respect to one picture element described hereinbefore will be carried out repeatedly as to all of the picture elements (Step S51).

In the embodiment described hereinbefore, although the output from the A/D converter 22 is directly inputted into the CPU 20 through the input/output port 30, the output may be inputted into the CPU 20 after once converting it into the density value using a logarithmic table. Furthermore, in the embodiment, the generation of the basic clock 4fcp from the CPU 20 is performed at a high speed at the photoelectric conversion/accumulation time and the transfer time and at low speed at the read-out time of the one picture element, but it is not always necessary to generate the clock 4fcp at a low speed in the read-out time.

According to this invention, since the generation or oscillation and frequency of the basic clock signal are controlled by the software of the CPU provided with no pulse oscillator, the construction of the hardware of the system to which this invention is applied can be simplified. In addition, since the read-out process of the data of the image sensor is performed for every picture element of the entire picture surface and the characteristic value operation with respect to the data of every picture element, the total processing time or period can be substantially reduced.

It should be understood that many modifications and adaptations of the invention will become apparent to those skilled in the art and it is intended to encompass such obvious modifications and changes in the scope of the claims appended hereto.

What is claimed is:

1. A method for controlling an accumulation type photoelectric conversion element using a central processing unit comprising the steps of generating a basic clock signal with the central processing unit for driving the accumulation type photoelectric conversion element and controlling at least one mode of a group of modes consisting of a photoelectric conversion/accumulation mode, a transfer mode, a hold mode and a read-out mode by said basic clock signal generated by the central processing unit;

wherein a frequency of the basic clock signal for driving the accumulation type photoelectric conversion element in said read-out mode is made lower than frequencies of the basic clock signals in said photoelectric conversion/ accumulation mode, said transfer mode and said hold mode.

2. A method for controlling an accumulation type photoelectric conversion element using a central processing unit comprising the steps of generating a basic clock signal with the central processing unit for driving the accumulation type photoelectric conversion element and controlling at least one mode of a group of modes consisting of a photoelectric conversion/accumulation mode, a transfer mode, a hold mode and a read-out mode by said basic clock signal generated by the central processing unit;

wherein a characteristic value necessary for logarithmic conversion and picture treatment is calculated in said central processing unit while picture information regarding one picture element of said accumulation type photoelectric conversion element is being outputted from image information regarding all picture elements held in the read-out mode.

* * * * *